United States Patent [19]
Korner

[11] 3,801,722
[45] Apr. 2, 1974

[54] ELECTRICAL PENETRATION ASSEMBLY
[75] Inventor: Renzo L. Korner, Horseheads, N.Y.
[73] Assignee: Westinghouse Electric Corporation, Pittsburgh, Pa.
[22] Filed: Sept. 11, 1972
[21] Appl. No.: 287,924

[52] U.S. Cl.................. 174/11 R, 174/18, 174/151
[51] Int. Cl. ...................... G21c 13/02, H01b 17/26
[58] Field of Search ..... 174/11 R, 11 BH, 18, 23 R, 174/70 S, 151

[56] References Cited
UNITED STATES PATENTS
2,661,389   12/1953   Presswell...................... 174/151 UX
3,082,291   3/1963    Parkinson et al.............. 174/70 S X
3,520,989   7/1970    Funk et al........................... 174/151
3,601,526   8/1971    Bohne et al......................... 174/151

Primary Examiner—Laramie E. Askin
Attorney, Agent, or Firm—W. G. Sutcliff

[57] ABSTRACT

An electrical penetration assembly for passing electrical conductors through the wall of a pressure containment vessel. The electrical penetration assembly is comprised of at least two header members having passages through which the electrical conductors pass and are sealed. Preformed electrical insulator support members having openings for conductors are provided within the passages provided in the header members and silicone elastomer potting sealant compound is introduced into the passages to seal the conductors within the openings in said support members and within the passages in said headers.

5 Claims, 11 Drawing Figures

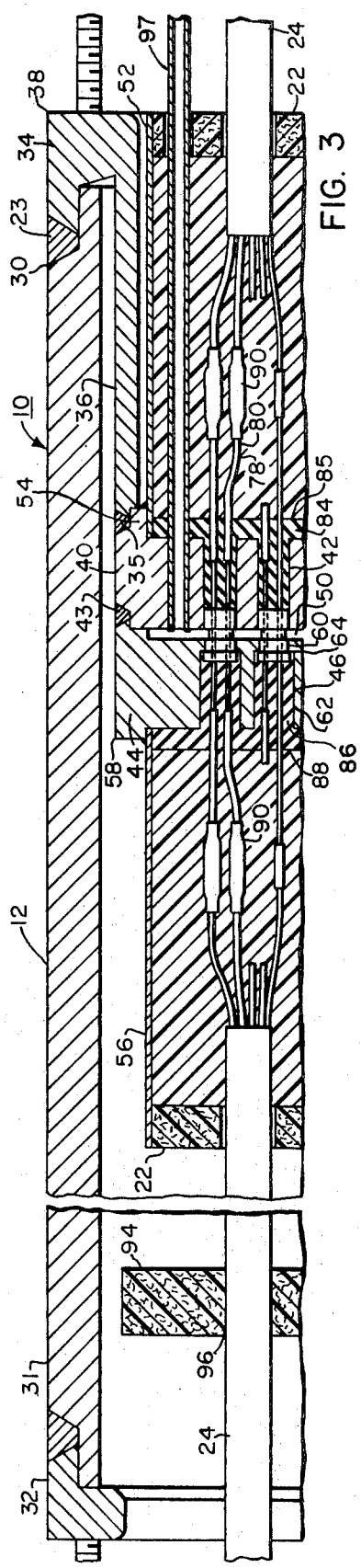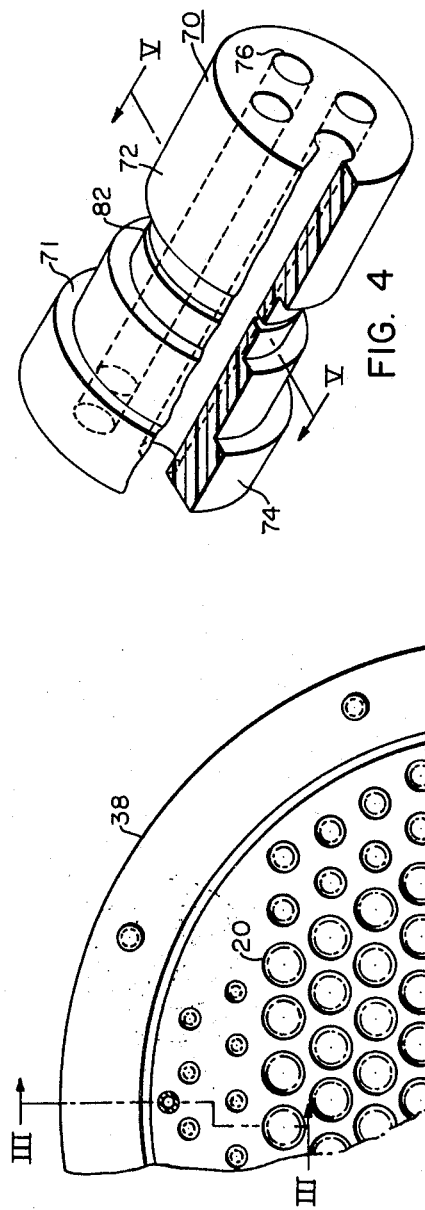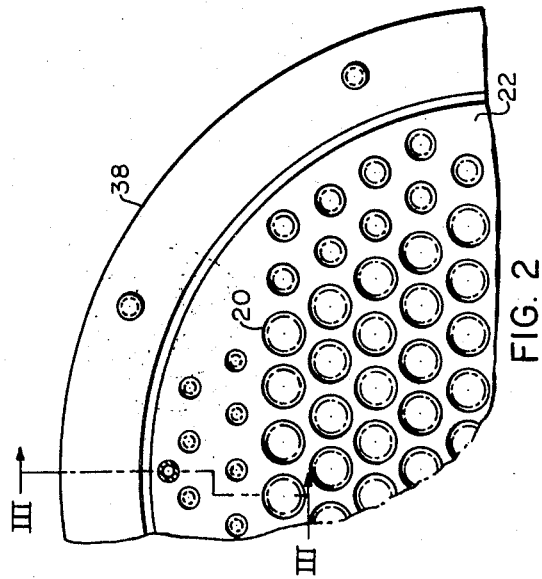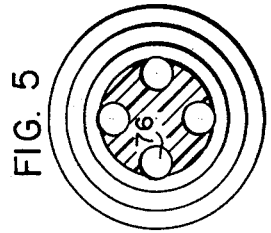

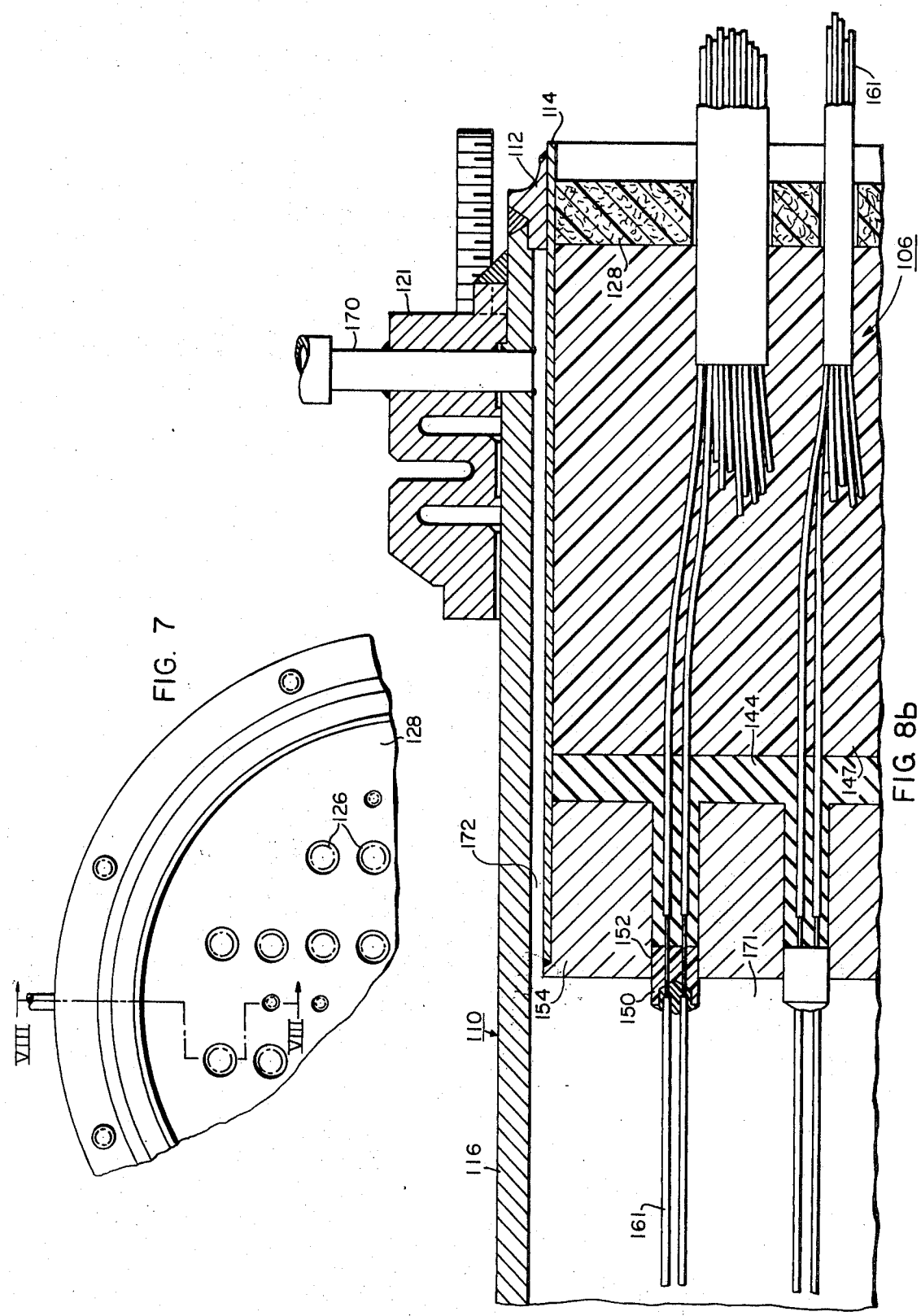

3,801,722

ELECTRICAL PENETRATION ASSEMBLY

BACKGROUND OF THE INVENTION

An electrical penetration assembly is utilized for passing electrical conductors through the wall of a pressure and vapor containment vessel such as utilized in a nuclear reactor. Penetration nozzles or tubular pipe members of metal are normally provided through the walls of the vessel. The electrical penetration assembly is constructed and inserted into the penetration nozzle to provide a vapor and pressure seal of the nozzle while providing a number of electrical conductors through the containment wall to permit application of electrical controls to the reactor within the containment vessel. A variety of electrical penetrations are known such as described in U.S. Pat. No. 3,520,989, issued to F. E. Funk et al, and U.S. Pat. No. 3,601,526, issued to F. G. Bohne et al.

The problems facing the industry in the design of these containment electrical penetrations is to provide for a feed through of many electrical conductors per unit area and yet still provide adequate vapor and pressure seals of long life time. It is also necessary to provide a seal at spaced headers so as to permit periodic gas leak testing of the seals. Another requirement of the seal is that a jet force over the inner header must not jeopardize the integrity of the second header. This requires that the sealant utilized within the wall remain intact even if when deflections or deformations of the header are relatively large. It is another requirement that thermal expansions between the different materials be accommodated within the containment penetration assembly within certain design basis events. It is necessary that the sealant readily accommodates expansions that might occur with a temperature of 340°F concurrent with pressures of 80 psig. It is these design requirements that face the industry in providing a suitable containment electrical penetration assembly.

SUMMARY OF THE INVENTION

This invention describes a containment electrical penetration assembly of a design to provide a large density of electrical conductors within a unit area. It also provides vapor and pressure seals and adequate testing for reactor penetration environment. This is provided within the penetration assembly by providing two spaced headers positioned in a canister or envelope member with a monitor volume or enclosed space defined between the two headers for monitoring the condition of the seals in the headers. An insulating spacer support member is provided within passages in said header members for spacing the electrical conductor passing through the passages in said header member. The apertures and the support members through which the electrical conductors pass and the spacing between the walls of the passages and the support members being such that, with suitable viscosity potting materials such as resilient silicone resin a good vapor and pressure seal will be made. Additional potting material of less resilient material is provided on the remote surface of the header with respect to the monitoring region.

BRIEF DESCRIPTION OF THE DRAWINGS

For a better understanding of the invention, reference may be had to the preferred embodiments, exemplary of the invention, shown in the accompanying drawings, in which:

FIG. 2 is a partial end view of the electrical penetration assembly illustrated in FIG. 1;

FIG. 3 is a sectional view taken along line III—III of FIG. 2;

FIG. 4 is an enlarged perspective view of the insulating support spacer illustrated in FIG. 3;

FIG. 5 is a sectional view of the insulating spacer member taken along the line V—V of FIG. 4;

FIG. 7 if a partial end view of the assembly shown in FIG. 6;

FIGS. 8a and 8b are sectional views taken along lines VIII—VIII of FIG. 7;

FIG. 9 is a perspective view, partly in section, of the insulating support spacer in the inner header illustrated in FIG. 8a.

DESCRIPTION OF THE PREFERRED EMBODIMENT

Figure 1:
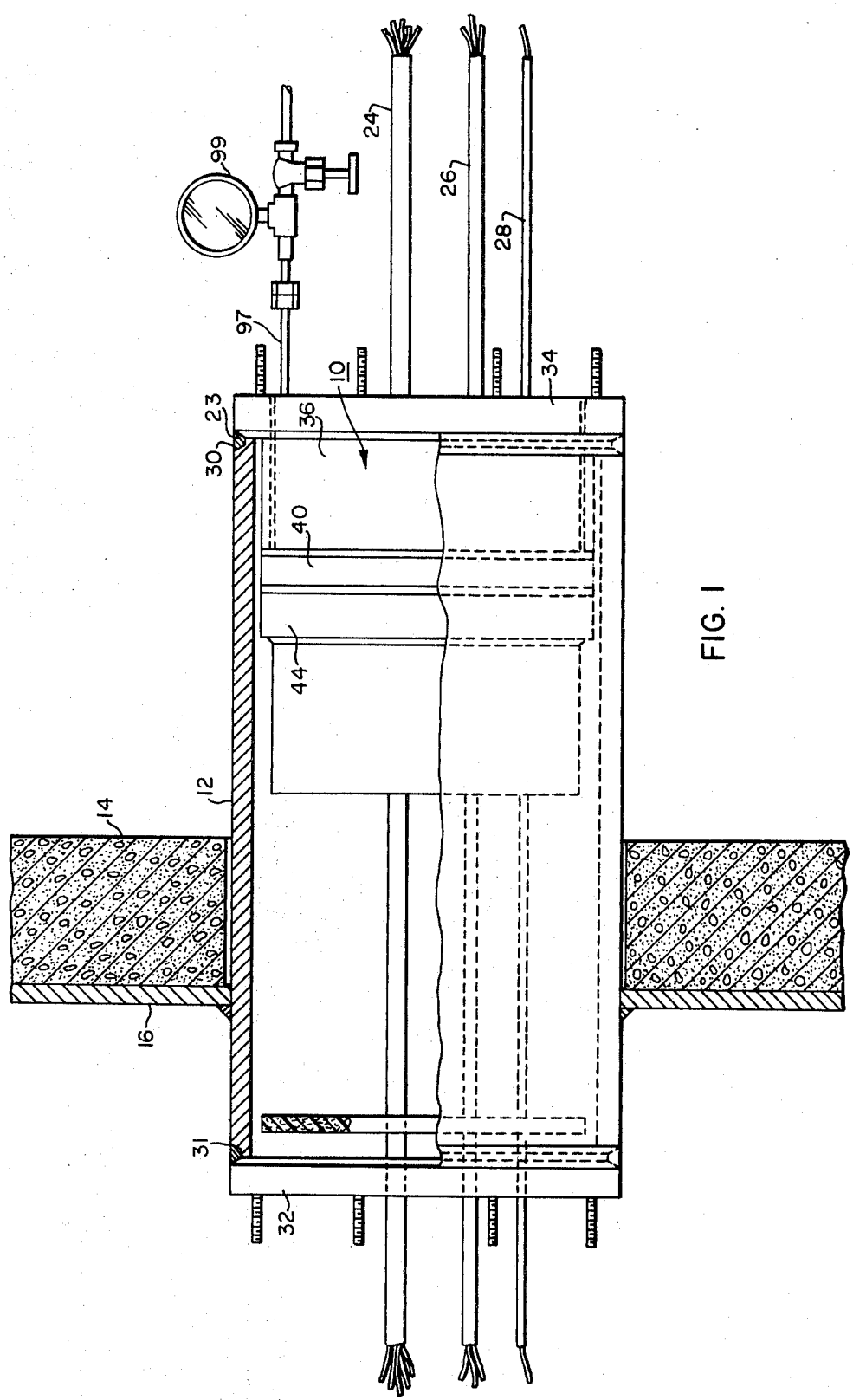
FIG. 1 is a longitudinal view, partly in section, illustrating the general form of the penetration assembly mounted within the wall of a containment vessel in accordance with the teachings of this invention.

Referring now to FIGS. 1 through 5, there is illustrated an electrical penetration assembly 10 mounted within a penetration nozzle 12. As shown in FIG. 1, the penetration nozzle 12 is positioned within an opening in a concrete wall 14 and the steel liner 16. The penetration nozzle 12 is welded to the steel liner 16. The penetration nozzle 12 is tubular and may have a diameter of about 12 inches and a length of about 24 inches. In a typical installation, there may be as many as 40 penetration nozzles provided within the containment vessel. Within a single penetration assembly 10 there may be as many as 200 to 300 openings 20 provided in an outboard spacer 22. Through each of the openings 20, there may may be one or more electrical conductors or sheaths of conductors passing through the assembly 10. A few conductors 24, 26 and 28 are illustrated in FIG. 1.

The penetration assembly 10 is welded to the outboard end 30 of the nozzle 12 as indicated in FIGS. 1 and 3 as weld junction 23. It is also the normal procedure to provide a junction box both at the inboard end 31 of the nozzle 12 and at the outboard end 30 of the nozzle to facilitate connections to the equipment. As indicated in FIG. 1, a weld ring 32 is provided on the inboard end of the nozzle 12 for mounting a junction box. A canister weld ring member 34 is comprised of a tubular canister member 36 of smaller diameter than the internal diameter of the nozzle 12 and an outwardly extending flange portion 38 which is welded to the inboard end 30 of the nozzle 12 at weld junction 23. The other end of the tubular canister member 36 is welded to the outer header member 40 at weld junction 35. The canister 36 may be of a steel and the header member 40 may be of stainless steel. The header member 40 is a disc-shaped member positioned transverse to the longitudinal axis of the penetration assembly 10. A plurality of passages 42 are provided within the outboard header 40 through which electrical conductors pass.

Positioned adjacent to the outboard header 40 is an inboard header 44 which also has a plurality of passages 46 through which the electrical conductors pass, and a monitor region 50 is provided between the inboard header 44 and the outboard header 40. The inboard header 44 may also be of stainless steel and is welded to the outboard header 40 at the outer periphery at weld junction 43 as indicated in FIG. 3. A tubular shroud member 52 is welded to the back surface of the outboard header 40 and the surface of the outboard header 40 is provided with an annular flange 54 which surrounds the inner end of the tubular shroud 52 as indicated in FIG. 3. An inboard shroud member 56 also tubular in shape and having a diameter of about 10 inches and a length of about 5 inches is welded to the back surface of the inboard header 44 remote to the monitor region 50 and with an annular flange 58 provided thereon and within which the tubular shroud 56 is located and welded. The passages 46 in the inboard header 44 include a first portion 60 adjacent the front surface of the header 44 of smaller diameter than the remainder portion 62 so that a shoulder portion 64 is provided therein. The passages 42 in the outboard header 40 may be of uniform diameter as similar to the diameter of portions 60 in the passages of the inboard header 44.

A preformed spacer support member 70 of a suitable insulating material such as a polysulfone resin is positioned within the passages 42 and 46. The spacer 70 has an outer cylindrical surface with a first portion 72 which is inserted into the passage 42 in the outboard header 40. The outer diameter of thee portion 72 may be about 0.372 inch while the diameter of the passage 42 may be about 0.380 inch. This spacing is critical in order to provide a good seal between the spacer 70 and the passages 42 and 46, and the spacing may range from about 0.001 inch to 0.010 inch. The spacer 70 extends between the headers 40 and 44. A portion 74 is provided on the spacer 70 of greater diameter than portion 72. A shoulder portion 71 rests on the shoulder 64 within the passage 46 of the inboard header 44. In this manner, the spacer 70 is locked into the passage 46 to resist any movement to the right as a result of a sudden increase of pressure in the containment vessel.

The insulating spacer 70 is provided with one or more longitudinal openings 76 through which one electrical conductor 78 may extend. The electrical conductor 78 includes an insulating coating 80 of a suitable material such as heat shrinkable polyolefin which is illustrated in FIG. 3. The portion of the conductor 78 is normally bare along the portion passing through the spacer 70 and for about a distance of one-half inch on each side thereof. As shown in FIGS. 3 and 4 a circular groove 82 is provided within the outer periphery of the insulating spacer 70 in the region within the monitor region 50 to permit communication between the openings 76 in the insulating spacer 70 and monitor region 50.

The passage 42 in the outboard header 40 and the passage 46 in the inboard header 44 are filled with a suitable rubberlike potting material which is silicone elastomer. A suitable material is Sylgard 185 potting and encapsulating resin sold by Dow Corning. As can be seen from FIG. 3, the spacer member 70 not only spaces and insulates the electrical conductors 78 passing therethrough, but also provides a stop in the bottom of the passages 42 and 46 so that the potting material 84 may be poured into the passages 42 and 46 to enclose the conductors 78 within the passages 42 and 46. In addition, a barrier portion 85 is provided extending across the entire back surface of the header 40 and remote from the monitor region 50. The clearance between the conductors 78 and the openings 76 should be between 0.001 and 0.002 inch. The silicone elastomer potting material has a viscosity at 25°C of about 11,000 centipoises prior to curing. It retains properties over a wide temperature range of −65°C to 250°C. It has a tensile strength of about 800 to 1,000 psi and also has good damping qualities. The passages 46 in the inner header 44 are filled with similar potting material and cured to form the portion 86 filling the passage 46 and also providing a barrier layer 88 on the rear surface of header 44. A suitable primer for Sylgard 185 also supplied by Dow Corning is utilized prior to filling with the potting material.

As can be seen from FIG. 3, the inboard shroud 56 confines the wafer portion 88 of the silicone resin potting material and the shroud 52 confines the wafer portion 85 with respect to the outboard header 40. The insulating coating 80 on the conductor 78 may also be of silicone resin and as shown in FIG. 3. The silicone material 84 and 86 covers the exposed portions of the conductors 78 and also a portion of the insulated coated portion of the conductors 78. It may also be desirable to provide connectors 90 which are normally provided by mechanical means to secure the conductors together and then provide a silicone resin coating thereon with a heat shrinkable insulation about the silicone resin coating.

The remaining portions of the shrouds 56 and 52 are then substantially filled with another potting material less resilient than the silicone resin, such as epoxy resin; and an inboard spacer and outboard spacer 22 are provided to complete the assembly. The epoxy resin may be XR 5126 supplied by Minnesota Mining. The epoxy is mixed with shotglass glass beads. There are two parts of epoxy to one part of beads by weight. The sheath 24 coming out of the inboard spacer 22 may be provided with spacing disc 94 having a plurality of apertures 96 to accommodate the electrical conductors within a sheath 24. A plurality of these spacing discs 94 may be provided within the nozzle 12. The support discs 94 provide support for the electrical conductors from a penetration assembly 10 to the inboard end of the nozzle 12. A monitor tube 97 connects the monitoring region 50 with a gauge 99 provided exterior of the assembly 10. A suitable gas may be introduced into the region 50 thereby, and any leakage through the headers 40 and 44 will be indicated on the gauge 99.

Figure 6:
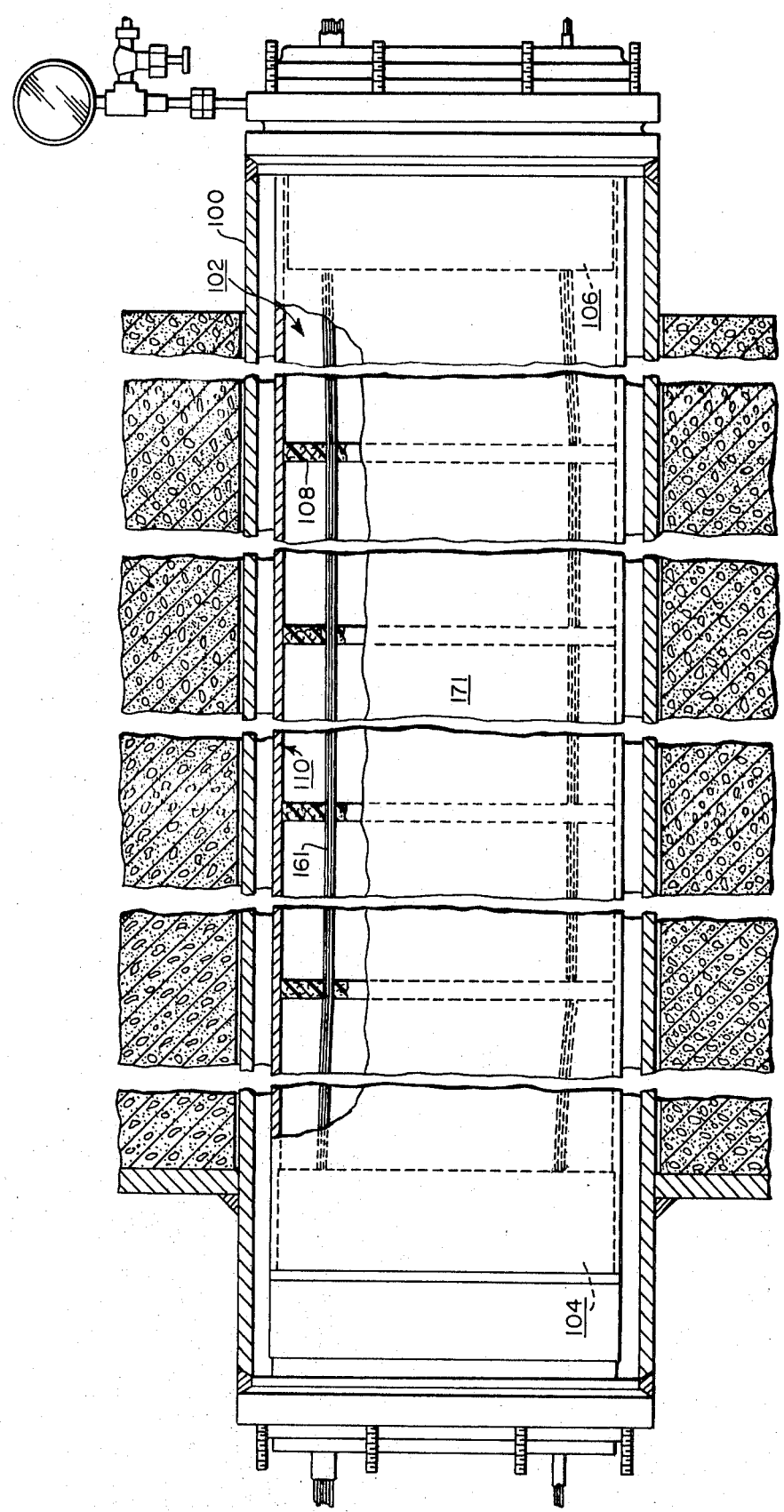
FIG. 6 illustrates a modified electrical penetration assembly mounted in a thick containment wall in accordance with the teachings of this invention.

The embodiment shown in FIGS. 6 through 10 is adapted to the situation wherein the headers in the electrical penetration assembly are positioned a substantial distance apart. In FIG. 6 the penetration nozzle 100 has a length of about 10 feet with the diameter again about 12 inches. The electrical penetration assembly 102 in FIG. 6 includes an inboard or inner header assembly 104 and an outer or outboard header assembly 106. These two assemblies 104 and 106 are illustrated in the sectional view shown in FIGS. 8a and 8b, respectively. They may be positioned about 9 feet apart. The electrical connectors 161 between the two headers 104 and 106 are supported by means of bracing members 108 along the length of the penetration assembly 102.

The penetration assembly 102 consists of a canister member 110 which is tubular in shape and is provided with a weld ring 112 at the outboard end shown in FIG. 8b. The weld ring 112 is welded to the canister member 110 and the outboard shroud member 114. The canister member 110 is comprised of two sections 116 and 118. The section 116 is connected to the outboard header assembly 106 and extends substantially the entire length of the nozzle 100. For fabrication reasons, the portion 118 of the canister 110 is substantially the length of the inboard header assembly 104 and has one end welded to the header 134 at weld point 120 and is also welded to the section 116 at weld point 122. A weld ring 124 is provided on the inboard end of the canister 110 and is welded to the canister 110 and to the penetration nozzle 100.

Figure 9:
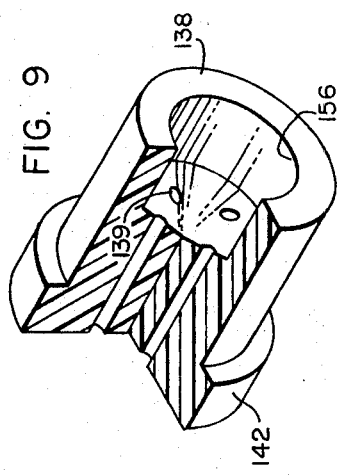
Figure 8A:
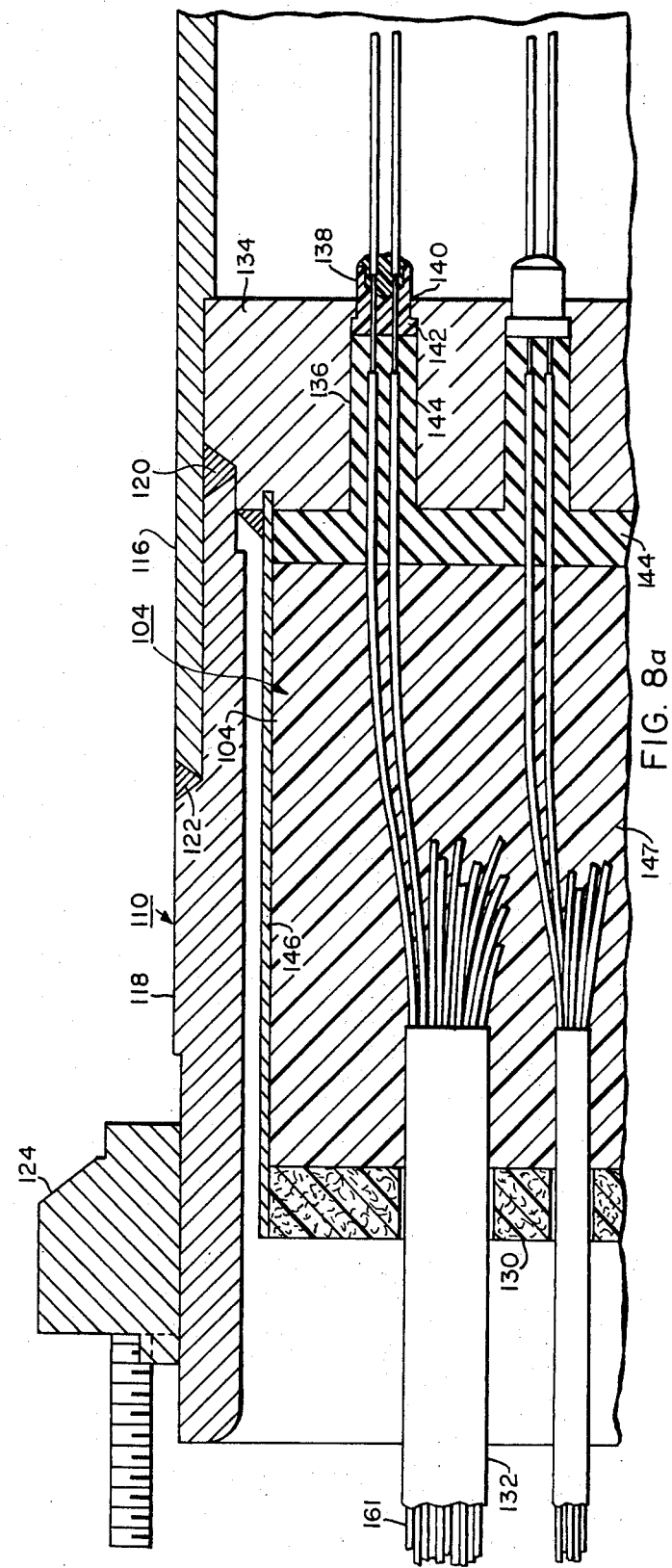

An outboard weld ring 121 is welded to the canister 110 and the nozzle 100. FIG. 7 generally indicates an end view of the outboard end of the penetration assembly 102 and shows the apertures 126 in the outboard spacer member 128. The inboard header assembly 104 consists of a spacer member 130 of a suitable material such as fiberglass filled polyester having apertures therein through which the electrical conductors 161 normally within the sheaths 132 pass. An inboard header member 134 is a disc member of a suitable material such as stainless steel having a plurality of passages 136; and an insulating support spacer 138 is shown positioned within the passages 136. The spacer 138 is illustrated in FIG. 9. Openings 139 are provided for the conductors 161. The passage 136 again includes an extending shoulder portion 140 while the support spacer 138 includes an outwardly directed shoulder member 142. The two shoulder portions 140 and 142 engage so as to prevent movement of the insulating spacer 138 toward the outboard header. This assembly also provides a potting fixture for introducing the silicons resin potting 144 which fills up the remainder of the passage 136 in the header 134. The inboard shroud member 146 is a tubular member secured to the header 134 and provides a fixture for introducing potting material into the header assembly 104. The silicone resin material 144 fills the passage 136 and also provides a barrier across the surface of the header 134 of a thickness of about 0.5 inch. A suitable epoxy resin potting material, as described with respect to previous embodiments, fills up substantially the remainder of the shroud 146 and is indicated as 147; and the fiberglass filled polyester spacer 130 closes off the end of the inboard shroud 146.

Figure 10:
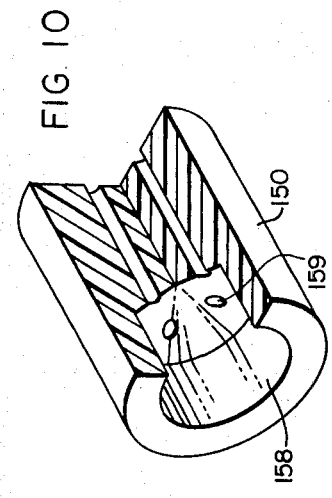
FIG. 10 is a perspective view, partly in section, of the insulating support spacer in the outer header illustrated in FIG. 8b.

The outboard header assembly 106 is similar to the inboard header assembly 104 with the slight variation as to the shroud 114 position with respect to the header 154 and a difference in the insulating support spacer 150 in the outboard header assembly 106. The spacer 150 is not provided with a shoulder nor is the passage 152 in the header 154 provided with a shoulder. The spacer 150 still provides the function of spacing and insulating the conductors 161 as well as providing a fixture in the passage 152 in the potting process. The spacer 150 is illustrated in FIG. 10. Openings 159 are provided in the spacer 150 for the conductors 161.

It has also been found desirable to provide a potting composition such as epoxy resin within a recess portion 156 of the inboard insulating spacer 138 and in a recess portion 158 in the outboard insulating spacer 150. The conductors 161 are free of insulation covering in that region passing through the insulator spacers 138 and 150. The bare portions of the conductors 161 extend for a distance of about one-half inch to the silicone resin potting material 144 of the type described with respect to the previous embodiment.

A monitor region 171 is formed between the two headers 134 and 154. The canister 110 forms an envelope therebetween. The annular spacing 172 between the canister 110 and outboard header assembly 106 connects with the region 171 and a monitor port 170 connects to the space 172. This permits monitoring of the seals formed in the header assemblies 104 and 106.

It is obvious that other modifications of this invention may be made without departing from the spirit of the invention.

What is claimed is:

1. An electrical penetration assembly for a containment vessel and for insertion into a penetration nozzle sealed in the wall of said vessel, said electrical penetration assembly comprising a pair of spaced header members, an envelope portion between said headers defining a vapor and pressure sealed monitoring region between said headers, each of said header members having at least one passageway therethrough, an insulating spacer member fitted within a portion of each passageway of each header member, with at least one aperture through said insulating spacer member, an electrical conductor passing through said aperture in said insulating spacer member and extending through said passageway of each header member, with a silicone elastomeric potting material filling the remainder of each passageway and extending beyond each of the passageways as a wafer across the back surface of each header member, a tubular shroud member sealingly secured to and extending from the back surface of each header member, said shroud member encompassing said wafer of silicone elastomeric potting material, and a second less resilient potting material substantially filling the remainder of each said shroud member sealing each shroud member, with said electrical conductor sealingly passing through said silicone elastomeric potting material and said second less resilient potting material.

2. The assembly set forth in claim 1 in which the less resilient potting material is an epoxy resin.

3. The assembly specified in claim 1, wherein said insulating spacer member extends through the monitoring region between each of said headers.

4. The assembly set forth in claim 1, wherein one of said header members is the inner header, with the passageway through the inner header having an inwardly extending shoulder portion, and said insulating spacer member has an outwardly extending shoulder portion which fits the inner header shoulder portion to lock said insulating spacer member within said inner header passageway with respect to any forces directed outwardly from said containment vessel.

5. The assembly specified in claim 1, wherein a plurality of passageways are provided through said headers, with an apertured insulating spacer member within a portion of each said passageway, with electrical conductors passing through each apertured insulating spacer member, and also sealingly passing through each said passageway, said silicone elastomeric potting material, and said less resilient potting material.

* * * * *